(12) United States Patent
Pietschner et al.

(10) Patent No.: US 12,128,343 B2
(45) Date of Patent: Oct. 29, 2024

(54) FILTER ARRANGEMENT AND METHOD

(71) Applicant: HENGST SE, Münster (DE)

(72) Inventors: Sieghard Pietschner, Greven (DE); Roland Edlerherr, Menden (DE); Moritz Dorschel, Münster (DE)

(73) Assignee: HENGST SE, Münster (DE)

( * ) Notice: Subject to any disclaimer, the term of this patent is extended or adjusted under 35 U.S.C. 154(b) by 508 days.

(21) Appl. No.: 17/289,765

(22) PCT Filed: Oct. 9, 2019

(86) PCT No.: PCT/EP2019/077323
§ 371 (c)(1),
(2) Date: Apr. 29, 2021

(87) PCT Pub. No.: WO2020/088899
PCT Pub. Date: May 7, 2020

(65) Prior Publication Data
US 2021/0394108 A1    Dec. 23, 2021

(30) Foreign Application Priority Data
Oct. 31, 2018    (DE) .......................... 102018127303.7

(51) Int. Cl.
*B01D 46/00*        (2022.01)
*B01D 46/24*        (2006.01)
(Continued)

(52) U.S. Cl.
CPC ..... *B01D 46/0086* (2013.01); *B01D 46/0049* (2013.01); *B01D 46/2411* (2013.01);
(Continued)

(58) Field of Classification Search
CPC ............ B01D 46/0086; B01D 46/0049; B01D 46/2411; B01D 46/429; B01D 46/446;
(Continued)

(56) References Cited

U.S. PATENT DOCUMENTS

| 4,507,130 A | 3/1985 | Roth |
| 5,711,785 A | 1/1998 | Maxwell |
(Continued)

FOREIGN PATENT DOCUMENTS

| CA | 1 201 788 | 3/1986 |
| CN | 108 525 409 | 9/2018 |
(Continued)

OTHER PUBLICATIONS

Translation of CN108525409, accessed Sep. 6, 2023 (Year: 2018).*
(Continued)

*Primary Examiner* — Christopher P Jones
*Assistant Examiner* — Phillip Y Shao
(74) *Attorney, Agent, or Firm* — Dority & Manning, P.A.

(57) ABSTRACT

The invention relates to a filter arrangement comprising a filter cartridge, having an opening and a wall which is formed by a filter medium and has an inner side delimiting a clean side of the filter and an outer side delimiting a raw side of the filter, a fan for conveying air to be purified first through the wall and subsequently through the opening of the filter cartridge, and a purification device, which is configured to convey a jet of compressed air through the opening into the filter cartridge and through the wall out of the filter cartridge, for conveying dirt away from an outer wall of the wall. The invention also relates to a method for detecting a leak of a filter cartridge, wherein the filter cartridge has an opening and a wall which is formed by a filter medium and has an inner side delimiting a clean side of the filter and an outer side delimiting a raw side of the filter.

17 Claims, 7 Drawing Sheets

(51) Int. Cl.
  *B01D 46/42* (2006.01)
  *B01D 46/44* (2006.01)
  *B01D 46/58* (2022.01)
  *B01D 46/71* (2022.01)
(52) U.S. Cl.
  CPC ......... *B01D 46/429* (2013.01); *B01D 46/446* (2013.01); *B01D 46/448* (2013.01); *B01D 46/58* (2022.01); *B01D 46/71* (2022.01); *B01D 2273/30* (2013.01)
(58) Field of Classification Search
  CPC ...... B01D 46/448; B01D 46/58; B01D 46/71; B01D 2273/30; B01D 46/0095; B01D 46/04
  See application file for complete search history.

(56) References Cited

U.S. PATENT DOCUMENTS

| | | | | |
|---|---|---|---|---|
| 2002/0014156 | A1* | 2/2002 | Leibold | B01D 46/0095 95/280 |
| 2009/0095152 | A1* | 4/2009 | Lindsey | B01D 46/442 96/417 |
| 2010/0010777 | A1* | 1/2010 | Farmer | B01D 50/20 702/184 |
| 2011/0023709 | A1* | 2/2011 | Bosshard | B01D 46/442 96/417 |
| 2015/0176545 | A1* | 6/2015 | Troxell | B01D 46/72 55/302 |
| 2020/0298163 | A1* | 9/2020 | Baxter | B01D 46/0086 |

FOREIGN PATENT DOCUMENTS

| | | |
|---|---|---|
| DE | 69304608 T2 | 3/1997 |
| DE | 102009017858 A | 10/2010 |
| EP | 3403709 A | 11/2018 |
| WO | WO 00/07694 | 2/2000 |
| WO | WO-2013024331 A1 * | 2/2013 ......... B01D 46/0086 |

OTHER PUBLICATIONS

PCT International Search Report (w/ English translation) and Written Opinion for corresponding PCT Application No. PCT/EP2019/077323, mailed on Apr. 2, 2020, 10 pages.

* cited by examiner

FILTER ARRANGEMENT AND METHOD

CROSS-REFERENCE TO RELATED APPLICATIONS

This application is a national phase entry of PCT International Application No. PCT/EP2019/077323 filed on Oct. 9, 2019, which, in turn, is based upon and claims the right of priority to German Patent Application No. 102018127303.7 filed on Oct. 31, 2018, the disclosure of both of which are hereby incorporated by reference herein in their entirety for all purposes.

TECHNICAL FIELD

The invention relates to a filter arrangement comprising a filter cartridge, having an opening and a wall which is formed by a filter medium and has an inner side delimiting a clean side of the filter and an outer side delimiting a raw side of the filter, a fan for conveying air to be purified first through the wall and subsequently through the opening of the filter cartridge, and a purification device, which is configured to convey a jet of compressed air through the opening into the filter cartridge and through the wall out of the filter cartridge, for conveying dirt away from an outer wall of the wall. The invention also relates to a method for detecting a leak of a filter cartridge, wherein the filter cartridge has an opening and a wall which is formed by a filter medium and has an inner side delimiting a clean side of the filter and an outer side delimiting a raw side of the filter.

BACKGROUND OF THE INVENTION

Filter arrangements having a plurality of filter cartridges in the form of containers are known from the prior art. It is not unusual for up to 1000 filter cartridges to be connected in parallel in what are known as filter housings. Failure of just one of the filter cartridges, for example on account of a leak of a filter medium, may lead, as a result of increased clean-side emissions, to a complete production and/or plant stoppage and correspondingly high production outage costs. As a result, efforts have been made for decades to be able to identify a faulty filter cartridge as quickly and easily as possible.

In filter housings with a large number of filter cartridges connected in parallel, however, the leak of an individual filter cartridge is unable to be reliably detected by means of the differential pressure, since the volume flow through the individual defective filter cartridge increases whilst the differential pressure remains approximately constant. The faulty filter cartridge must be found using complex methods, for example by means of luminescent dusts and special cameras for detecting the faulty filter cartridge. The use of costly dust or emissions particle measuring devices may indeed isolate sources of damage to a specific area, but faulty filter cartridges are unable to be identified. A known method for volume flow measurement through individual filter cartridges uses impellers, however, these are susceptible to soiling and wear on account of moving parts. A further method for volume flow measurement uses hot-wire anemometers, which is very energy-consuming and thus costly.

DESCRIPTION OF THE INVENTION

Proceeding from this situation, an object of the present invention is to describe a filter arrangement and a corresponding method for identifying a faulty filter cartridge, in particular in a filter housing containing hundreds of filter cartridges connected in parallel, much more easily and economically.

The object of the invention is achieved by the features of the independent claims. Advantageous embodiments are described in the dependent claims.

The object is therefore achieved by a filter arrangement comprising
- a filter cartridge, having an opening and a wall which is formed by a filter medium and has an inner side delimiting a clean side of the filter and an outer side delimiting a raw side of the filter,
- a fan configured to convey air that is to be purified firstly through the wall and then through the opening in the filter cartridge,
- a purification device, which is configured to convey a jet of compressed air through the opening into the filter cartridge and through the wall out of the filter cartridge, for conveying dirt away from an outer wall of the wall, and
- a sensor configured to determine a force acting on a measurement region on account of the jet of compressed air.

An essential point of the invention lies in the fact that the filter cartridge is equipped with a sensor by means of which a filter cartridge no longer operating correctly, for example on account of a leak in the filter medium, may be localised in a simple and economical way. The proposed solution is advantageous in particular in the case of filter housings having hundreds of filter cartridges, since it is possible to determine a faulty filter cartridge in particular on the basis of a change to the force acting on the measurement region. The sensor may be designed as a differential pressure sensor in order to detect, in addition to a differential pressure of the filter cartridge, also an intensity of the jet of compressed air, which in particular is provided regularly and on the clean side. The solution is based on the knowledge that, in the event of a leak, the force acting on the measurement region or the intensity of the jet of compressed air is lower as compared to a filter cartridge that is operating correctly. To this end, the sensor is advantageously configured to determine a change to the force acting on the measurement region on account of the jet of compressed air. Particularly preferably, alternatively or additionally a differential pressure is detectable via the filter medium by means of the sensor, as will be explained in greater detail hereinafter. A leak of the filter cartridge is able to be detected in particular by determining a change to a negative amplitude of the differential pressure.

The filter cartridge may be designed arbitrarily. In a preferred embodiment the filter cartridge has a cylindrical container, in the upper side of which there is an opening. The opening is preferably circular and may form part of or the entire upper side of the container. The purification device is preferably designed to introduce the jet of compressed air through the opening into the filter cartridge for example at a line pressure of 4, 5, 6, 8 or 10 bar at regular intervals, for example every 1, 2, 3, 4, 5 or 10 seconds. To this end, the purification device may be formed with a nozzle, which is arranged above the container or wherein the purification device is arranged above the container.

The filter cartridge may be designed as a container having a wall made of a woven filter medium, as what is known as a filter hose, in the interior of which there is provided a support frame, such as a support cage. It is also possible that the filter cartridge is formed by one or more cylindrical filter elements having a fixed basic structure, for example having an upper and a lower end plate, a filter medium arranged in-between, and possible also a support structure arranged on the filter medium. In the case of a filter cartridge formed by a plurality of filter elements, these are typically arranged one above the other, such that the lower end plate of an upper filter element is located on the upper end plate of a lower filter element. To this end, both end plates may be provided with an opening and one or both end plates with a seal facing the other filter element. Up to or more than 10 filter elements may be arranged one above the other in this way in order to form a filter cartridge.

In normal operation of the filter cartridge, air that is to be purified may be sucked by a fan through the filter medium into an interior of the filter cartridge and through the opening. Particles purified from the air settle on the outer wall of the filter medium or of the side portion as dirt particles. The purified particles are "blasted" radially from the side portion by the jet of compressed air and may be caught in a collection container provided below the filter cartridge for further disposal or processing. A filter arrangement typically comprises a plurality of filter cartridges. The filter arrangement preferably has a central fan, which is provided at an inlet and/or outlet of the filter arrangement, and air to be purified is blown and/or drawn through all filter cartridges of the filter arrangement accordingly. A plurality of decentralised fans may also be provided in order to achieve a more homogeneous volume flow through the filter cartridges. Furthermore, a central cleaning device may be provided, by means of which the individual filter cartridges of a filter arrangement may be purified selectively, in parallel or sequentially by means of a jet of compressed air. In particular, a purification device may be provided, having one or more movable line arms each having a plurality of nozzles which move over the openings in the filter cartridges. During this movement, compressed air pulses may be delivered or a continuous stream of compressed air may be discharged, which, as a result of the movement over the openings of the filter cartridge in question then enters said cartridge as a jet of compressed air.

As a result, by determining the force acting on the measurement region on account of the jet of compressed air or a change to said force, it is possible to detect a potential leak of the filter cartridge. Especially in filter housings having hundreds of filter cartridges, in which, when there is an individual faulty filter cartridge, the volume flow through the other filter cartridges is only minimally lower and in which the differential pressure between the clean side of the filter and the raw side of the filter does not change significantly, and insofar as an individual faulty filter cartridge is not detectable, the proposed filter arrangement makes it possible for the faulty filter cartridge to be clearly identified in a particularly simple and reliable way. In this regard, the proposed solution minimises production and/or facility stoppages of filter housings and reduces corresponding outage costs. As the jet of compressed air spreads through the filter cartridge, a determinable volume flow is conducted outwardly over the wall of the filter cartridge and a positive pressure is generated in the filter cartridge. Since the jet of compressed air generally only lasts for a very short period, the jet of compressed air changes quickly into a negative pressure, without the entire compressed air volume blown into the filter cartridge passing outwardly through the filter wall. In the event of a leak in the filter wall, the volume flow passing outwardly during the jet of compressed air increases, so that the force detectable in the measurement region by the jet of compressed air decreases, since less air mass is present in the measurement region. The positive pressure generated in the individual filter cartridge by the jet of compressed air is also lower due to the increased volume flow in the event of a leak.

Besides the detection of a leak, other conclusions may also be drawn on the basis of the determination of the force acting on the measurement region. For example, incorrect installation of the filter cartridge, leading to a leak, may be detected if the force remains below an anticipated value already at the time of initial operation of the filter cartridge. Furthermore, a slow decrease in the measured force of individual jets of compressed air over a certain period of time may indicate that the measurement region is loaded slowly with particles, which on the one hand may be caused by a very small leak, but on the other hand also occurs in normal operation if particles that are unable to be filtered by the fineness of the filter medium are present in the air to be purified. Furthermore, it is possible to determine a leak or blockage of the purification device or lines and/or nozzles thereof on the basis of a simultaneous decrease in force in a plurality of filter cartridges. Furthermore, by analysing the measurement signals, that is to say the specific forces, of all filter cartridges, it is possible to determine the homogeneity of a purification process in the filter housing. In principle, it is desirable if all filter cartridges are passed through uniformly, i.e. the same force is measured in all filter cartridges. Should the analysis show a region that is passed through to a worse or better extent, the performance of the fan in this region and/or the performance of the purification device could be altered appropriately if the plant is designed accordingly. Furthermore, an increase in the force indicates an increasing blockage of the filter cartridge, since a smaller volume flow may pass through the filter medium in the event of an increasing blockage of the filter medium. Should this be determined, the purification performance could be increased if the plant is designed accordingly, or a signal to change the filter could be output.

For the above-mentioned analyses, all filter cartridges in a filter housing may be equipped with a measurement region or a sensor. It is also possible to equip merely some of the filter cartridges with the sensor. This may be advantageous in particular if certain soiling limit values are reached only once numerous leaks have occurred. The filter cartridges provided with a measurement region may specify a representative leak value which may be applied to the total number of filter cartridges. The equipped filter cartridges may be provided directly adjacently to one another in a region of the filter housing, in particular also a region with a particularly elevated occurrence of wear, for example in the direct vicinity of an air inlet to the filter housing, and/or may be distributed over the filter housing. For the above-mentioned analyses of homogeneity of the purification process or the determination of leaks in the purification device, it is logical to provide a uniform distribution over the filter housing.

The measurement region is preferably formed within the filter cartridges, on the wall or within the wall. The measurement region may also be provided on a surface of the filter medium, of a filter end plate, of a support cage, or of the sensor itself. The latter is the case particularly if the sensor itself is arranged within the filter cartridge. The sensor, within the filter medium, may also be, for example, sewn into a filter hose, moulded within a filter end plate for example, or arranged in a structure of a support cage, so as to monitor the measurement region. In addition, the sensor may be arranged outside the filter cartridge if the measurement region lies on the outer side of the filter cartridge. For example, as a result of a jet of force on a lower end plate of the filter cartridge, the outer side thereof may bulge outwardly.

In accordance with a preferred refinement, the measurement region is arranged opposite the opening in the filter cartridge. In this way, it may be ensured that the jet of compressed air is detected directly, since it is thus directed directly towards the measurement region. The measurement region is particularly preferably provided at the end of the filter cartridge opposite the opening in the filter cartridge. In this way, the most reliable measurement result is achieved, since the jet of compressed air necessarily weakens prior to reaching the measurement region.

Various possibilities also exist with regard to the design of the sensor. In accordance with a preferred refinement, the sensor is designed as a piezo element, as a membrane, as an elastomer film, in particular stretchable elastomer film, with in particular flexible electrodes, as a strain gauge, for measuring a differential pressure on the inflow and outflow side and/or as a differential pressure sensor for determining the differential pressure between an interior of the filter cartridge and the surroundings of the filter cartridge, as a microphone and/or as an optical sensor, for example a laser distance meter or a camera. The sensor may be arranged in particular within a lower end plate, on a lower end plate on the inner side in the filter cartridge or on the inner side on a carrier part removable from the filter cartridge at the lower side. Due to the attachment on the inner side, i.e. on the clean side, the sensor is not exposed to the potentially harmful soiling on the raw side. In the case of an elastomer film, the electrical capacitance changes as a result of the deformation of the film, whereby a change in force is able to be determined. In the case of a strain gauge, this is preferably integrated with RFID transponders. It is also conceivable that the sensor monitors a plurality of measurement regions of a plurality of cartridges. For example, a flexible membrane may be provided in a lower side of a cartridge, or the lower side of the cartridge may be formed from the filter medium, as is the case for example in what is known as a hose filter, such that a camera arranged beneath the cartridges is able to detect a stretching of the membranes or of the lower sides when the jet of compressed air is delivered. The camera may be provided such that a plurality of filter cartridges are arranged in its field of view.

The filter cartridge may be provided in a different design. For example, the cartridge may be designed as what is known as a hose filter, in which case the filter medium forms a long hose which at one end is likewise closed by the filter medium or by an end plate and at the other end forms the opening. The filter cartridge may also be designed as a filter cylinder, in which an inherently rigid filter medium is mounted between two end plates and may be supported by a support structure. In accordance with a preferred refinement, the filter cartridge is formed by at least two filter elements each with a wall formed by the filter medium, with an inner side delimiting the clean side of the filter and an outer side delimiting the raw side of the filter, wherein the outer side of the filter elements form an outer side of the filter cartridge. The filter cartridge may be formed by more than ten filter elements. In this way, the filter cartridges are able to be adapted very well to the filter arrangement. Depending on the plant, filter arrangements may differ significantly from one another in respect of features such as available installation space, fan performance and performance of the purification device. If the filter cartridges are constructed from individual filter elements, these requirements may be satisfied optimally. It may then preferably be possible to integrate the measurement region and the associated sensor already in one filter element. This filter element is preferably provided at the furthest distance from the opening in order to achieve the greatest possible measurement accuracy. In this case, cylindrical filter elements of the above-mentioned type in which the filter medium runs around the entire side of the filter elements so that the filter medium preferably covers the entire lateral surface of the cylindrical filter element may be used particularly well. The filter medium may additionally be designed in what is known as a star fold, in which the lateral surface of the cylinder is formed by a medium folded in a zigzagged fashion. Spacers may be arranged between the filter folds, for example beads of glue. In order for the airflow to be able to flow through the side portion, the filter medium is expediently air-permeable. The filter medium advantageously comprises cellulose, cellulose with synthetic fibre components, synthetic fibre media or synthetic fibre mix media, nanofibres, polytetrafluoroethylene, glass fibres, activated carbon, zeolites, ion exchangers, silica gel, screens, grids, meltblown/spunbond media, biofunctional layers and/or media equipped with functional protection against bacteria, viruses, allergens and/or fungi. The filter medium may also comprise a combination of the aforementioned materials.

The nanofibres preferably have a fibre diameter of less than 500 nm, preferably 200 nm. The fibre diameter may also be between 50 and 300 nm. The term "meltblown" shall be understood to mean in particular non-wovens formed from fibres which have been spun from polymer melts passing through nozzles, stretched by means of hot airflows until they are torn apart, and formed by direct deposition. Such non-wovens, also referred to as meltblown media, usually have longer endless fibres similar to staple fibres or consist of a mixture with endless fibres or fully of endless fibres. If non-wovens are formed from fibres that have been spun from polymer melts passing through nozzles, stretched by means of cold air and/or mechanically and formed by direct deposition, these are also referred to as spunbond non-wovens or generally as spunbond media. The filter media formed from these non-wovens are generally constructed from filaments or endless fibres. The synthetic fibres may comprise PES, PET, PP, PA, PBT, PTFE, etc. In addition, the filter media may comprise PTFE membrane media.

In an alternative refinement, the measurement region is formed on a carrier plate that is distanced from the filter cartridge and has the sensor. The carrier plate is preferably circular and/or is held in a carrier unit that is easily fastenable to the filter cartridge. The carrier plate may preferably be fitted on different filter cartridges or filter elements thereof so that, on the one hand, filter cartridges known from the prior art may be retrofitted with a carrier plate having a sensor of the kind under current discussion and, on the other hand, faulty sensors may be easily replaced by replacing the carrier plate.

In accordance with a further preferred embodiment, the filter arrangement has a computer-based control unit, for example in the form of a microcontroller, which is configured to determine a change to the force acting on a sensor by the jet of compressed air so as to detect a leak of the corresponding filter medium and/or to determine, on the basis of a change to the force acting on the sensor, that the corresponding filter cartridge needs replacing. The control unit is preferably configured to determine a change to the force over time, that is to say in relation to at least two successive jets of compressed air. In filter operation the sensor preferably measures the differential pressure over the filter cartridge. In purification operation, i.e. when the purification device delivers the jet of compressed air, a negative amplitude of the differential pressure of the pressure wave of the jet of compressed air may be detected by the sensor.

In accordance with a further embodiment, the sensor is designed as part of a sensor unit which additionally comprises the computer-based control unit. If the sensor is arranged on a carrier part, the entire sensor unit is preferably arranged on the carrier part. In this way, it is possible to ensure that the control unit runs through regular maintenance cycles, since the entire sensor unit may be exchanged at regular time intervals. In addition, some advantages results when a plurality of filter cartridges in a filter housing are equipped each with their own sensor unit. For example, when a leak is identified, the control unit may actuate a signal device, for example a signal light and/or a loudspeaker, mounted in particular on a visible side of the carrier part. In addition, the control unit, in the event of a communications connection, may send the evaluated data, that is to say information regarding the state of the filter cartridge and data regarding the above-mentioned analyses, to a central processing unit in a wired manner or wirelessly, which processing unit may also be at a remote location and connected via the Internet. The central processing unit or each individual control unit may emit a signal to a user or may also perform an emergency shutdown of the plant.

In a further embodiment, the sensor unit has at least one further sensor for detecting an ambient value, in particular a sensor for detecting temperature, air humidity, particles and/or harmful substances. The additional values obtained from the further sensor may be used to control the operation of the filter arrangement and/or may deliver characteristic values for the dependent determination of a filter leak, which values may be taken into consideration by the control unit. The filter medium and/or a measurement membrane may thus be flexible and air-permeable to differing extents depending on air humidity and temperature.

In accordance with a further preferred refinement, the filter cartridge has a communications device designed to wirelessly transfer a dataset generated by the control unit. The communications device is preferably part of a sensor unit. The communications device may also be arranged on a removable carrier unit of the kind previously described. The sensor unit or the filter cartridge preferably has a battery, the sensor, a memory and the control unit, which is connected to a receiving device for communication therewith. The forces determined by the sensor or datasets generated for this purpose may be stored temporarily in the memory and/or may be processed by the control unit, for example in respect of a detection of a change over time of the determined force. The control unit may easily transmit data sets to the receiving device, which then provides the data to the user. It is also possible that a user with a suitable device may send output requests to the communications unit, which then receives said requests and initiates a defined course of action. For example, this may be the output of a dataset, the initiation of a measurement cycle, or also the output of a sound or light signal, in particular with corresponding signal device at the filter cartridge.

In principle, the communications device may be designed arbitrarily. In accordance with a particularly preferred refinement, the communications device is designed for wireless transmission in accordance with a WLAN, RFID, Zig-Bee, Z-wave and/or Bluetooth standard. The communications device is preferably designed in accordance with an IEEE-802.11 WLAN standard, has an RFID transponder and/or is designed in accordance with an IEEE 802.15.1 Bluetooth standard. By providing a communications device, a plurality of filter cartridges may be checked for leaks and replaced as appropriate in a particularly comfortable way, without having to check each individual filter cartridge manually for defects.

In accordance with a preferred embodiment, the communications device is positioned in the filter cartridge in such a way that a main transmission power is emitted in a direction orthogonal to a line-up direction of the filter cartridges. Effectively, this means, in the case of predominantly cylindrical filter cartridges, which are typically lined up adjacently, that the main transmission power is emitted in the direction of one of the ends or both ends. The main transmission power may be irradiated through the opening in the filter cartridge into a free space arrange thereabove or through the lower end of the filter cartridge into a free space arranged therebelow, so that less interference by the other filter cartridges or metallic support structures thereof is anticipated and advantageously a single receiving device may be provided in the lower or in the upper free space.

A battery and/or what is known as an energy harvester may be provided on the sensor unit in order to provide the power supply of the sensor unit. Suitable systems may be, for example, piezo elements for recovering energy from pressure and/or vibration, thermoelectric generators, such as Peltier elements, or also passive systems for receiving electromagnetic radiation via an antenna, such as passive RFIDs. Particularly in the case of an RFID, an integration of sensor, communications device and power supply in a single element is possible.

In accordance with a further preferred embodiment, each sensor unit has a battery and is configured so that the corresponding communications device transmits a dataset only when a leak of the corresponding filter cartridge is determined or when it is determined that the corresponding filter cartridge needs replacing or following a fixed time interval or following receipt of an output request. In this way, it is ensured that the battery is minimally loaded and the sensor device is ready for operation over a long period of time, for example five years. It may also be provided that the sensor is not queried continuously, but only after fixed time intervals, for example once per hour, once per day or once per week. The frequency with which the sensor is queried is dependent on local legal provisions regarding the required purification. The battery is preferably designed such that the sensor may be queried continuously. Merely the communications device may transmit, after fixed intervals or only in the event that the filter cartridge needs replacing. In addition, the user may preferably transmit an outfit request to the communications device in order to check the state of the filter cartridges and also of the sensor unit.

In accordance with a further preferred embodiment, a receiving device for receiving datasets from the communications devices is provided and is configured to determine the transmission position of the particular communications devices on the basis of a corresponding signal strength and/or signal coding. This is implemented for example by means of the Zig-Bee, Z-wave and/or Bluetooth-Mesh standards, as a result of which the individual sensor units advantageously do not have to be mounted in a special order on the filter cartridges, and instead may be easily distributed freely without special care. The assignment of which filter cartridge is then faulty may be made via the assignment of the transmission position. If the transition position is only detected roughly, that is to say not unambiguously, in the alternative the sensor unit may be sent a request to activate a provided signal device, in particular light and/or sound.

In accordance with an alternative embodiment, the filter arrangement has a plurality of filter cartridges and a plurality of sensors each with an associated measurement region, wherein the computer-based control unit is configured to receive and to evaluate signals transmitted from the plurality of sensors and to determine, on the basis of a change to a sensor signal, a change to the force acting on the corresponding measurement region as a result of a jet of compressed air so as to detect a leak of the corresponding filter cartridge, and/or to determine, on the basis of the change to the sensor signal, that the corresponding filter cartridge needs replacing. Preferably, $\geq 100$, $\geq 200$, $\geq 300$, $\geq 400$, $\geq 600$, $\geq 800$, $\geq 1000$ and/or $\leq 400$, $\leq 600$, $\leq 800$, $\leq 1000$ or $\leq 1200$ filter cartridges are provided. More preferably, the filter cartridges are arranged in a common filter housing and/or are connected in parallel. In particular in the case of a wired transmission of the individual sensor signals, the evaluation may advantageously be performed by a single control unit. The sensors may be connected to the computer-based control unit over large distances. For example, the control unit, which by means of a receiving device receives and evaluates the sensor signals sent by the particular communications devices may be arranged at a remote control centre In the event that sensor signals or datasets are transmitted over the Internet, they may be sent in encrypted form accordingly.

The problem addressed by the invention is additionally solved by a method for detecting a leak of a filter cartridge, wherein the filter cartridge has an opening and a wall which is formed by a filter medium and has an inner side delimiting a clean side of the filter and an outer side delimiting a raw side of the filter, said method having the steps of:

supplying a jet of compressed air through the opening into the filter cartridge and determining a force acting on a measurement region as a result of the jet of compressed air.

In particular by determining a change over time of the force effected by a corresponding jet of compressed air and acting on the measurement region, it is possible to comfortably identify whether the filter cartridge is faulty, for example has a leak at the filter medium. This is because, when a cartridge functions correctly, the force acting on the measurement region during the jet of compressed air or the impulse over time in each case remain the same or approximately the same. If the filter medium is defective, for example on account of a leak, the force acting on the measurement region during the jet of compressed air is damaged by the leak or, in comparison to a correctly functioning filter cartridge, has a reduced negative amplitude of the differential pressure between an inner side and outer side. Accordingly, it is possible to reliably detect, by means of the proposed method, whether the filter cartridge is faulty.

In a preferred refinement, the method has the steps of:

transmitting a sensor signal, generated by a sensor on account of the jet of compressed air, from the filter cartridge to a control unit, and determining, by the control unit, a change in the force acting on the lower side as a result of the jet of compressed air so as to detect a leak of the corresponding filter medium, and/or determining, by the control unit, on the basis of the change to the force acting on the measurement region, that the filter cartridge needs replacing.

By means of such a refinement, in particular in the case of a filter housing with a variety of cartridges, a faulty filter cartridge is able to be determined for example from a central control centre having the control unit, without having to check each individual filter cartridge manually for leaks The control unit may be provided at remotely from the filter housing, for example it may be installed at the manufacturer of the filter cartridges or at a service provider. Alternatively, each sensor may be allocated its own control unit.

In accordance with a preferred refinement, the method comprises the step of generating a dataset comprising information regarding a state of the filter cartridge by the control unit and transmitting the data set by a communications device to a receiving device if, beforehand, an output request has been received by the communications device, and/or a leak of the corresponding filter medium has been detected by the control unit, and/or it has been determined by the control unit that the filter cartridge needs replacing.

In accordance with another preferred refinement of the method, a plurality of filter cartridges are provided. More preferably, the filter cartridges are arranged in a common filter housing. In a further preferred development of the method, the filter arrangement has a plurality of sensors. In particular, all filter cartridges may be equipped with a measurement region and an associated sensor. The sensor may also be arranged in a sensor unit, which in particular is removable from the filter cartridge. In the case of a plurality of filter cartridges, each filter cartridge preferably has a sensor as described previously.

In accordance with yet a further preferred refinement, the sensor is designed as a piezo element, as a membrane, as an elastomer film, in particular stretchable elastomer film, with in particular flexible electrodes, as a strain gauge, for measuring a differential pressure on the inflow and outflow side, as a differential pressure sensor for determining the differential pressure between an interior of the filter cartridge and the surroundings of the filter cartridge, as a microphone and/or as an optical sensor.

Further embodiments and advantages of the method will become clear to a person skilled in the art in analogy to the previously described filter arrangement.

BRIEF DESCRIPTION OF THE DRAWINGS

The invention will be explained in greater detail hereinafter on the basis of embodiment examples with reference to the accompanying drawings.

In the drawings.

DETAILED DESCRIPTION OF THE
EMBODIMENT EXAMPLES

Figure 1:
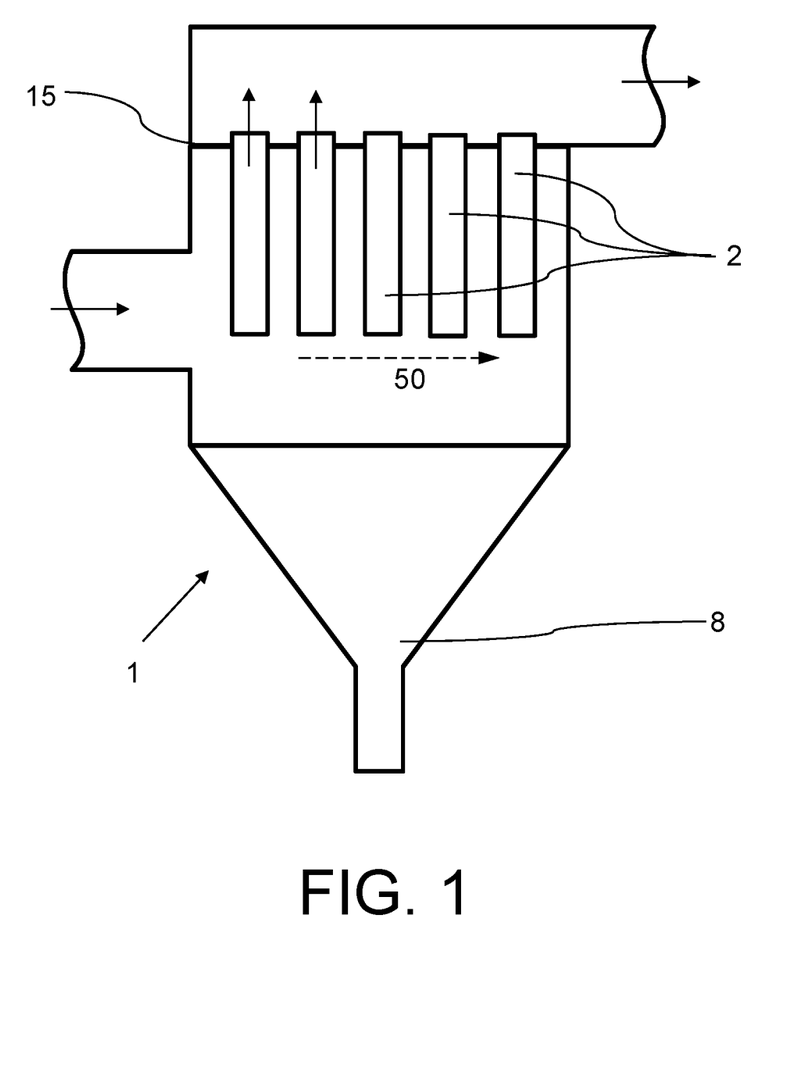
FIG. 1 shows a filter arrangement according to a preferred embodiment example of the invention in a schematic sectional view.
Figure 2:
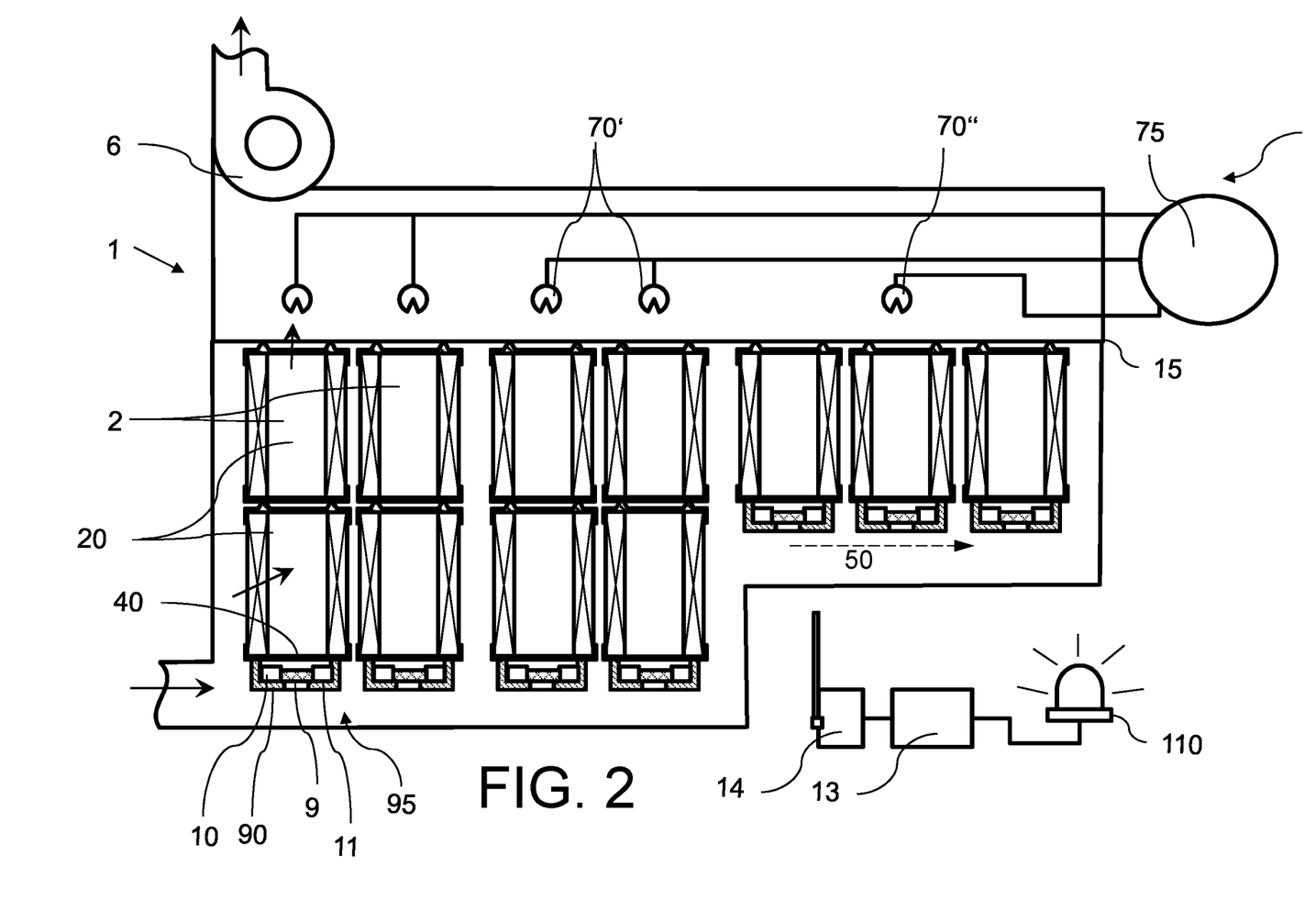
FIG. 2 shows a filter arrangement according to a further preferred embodiment example of the invention in a schematic sectional view.
Figure 3:
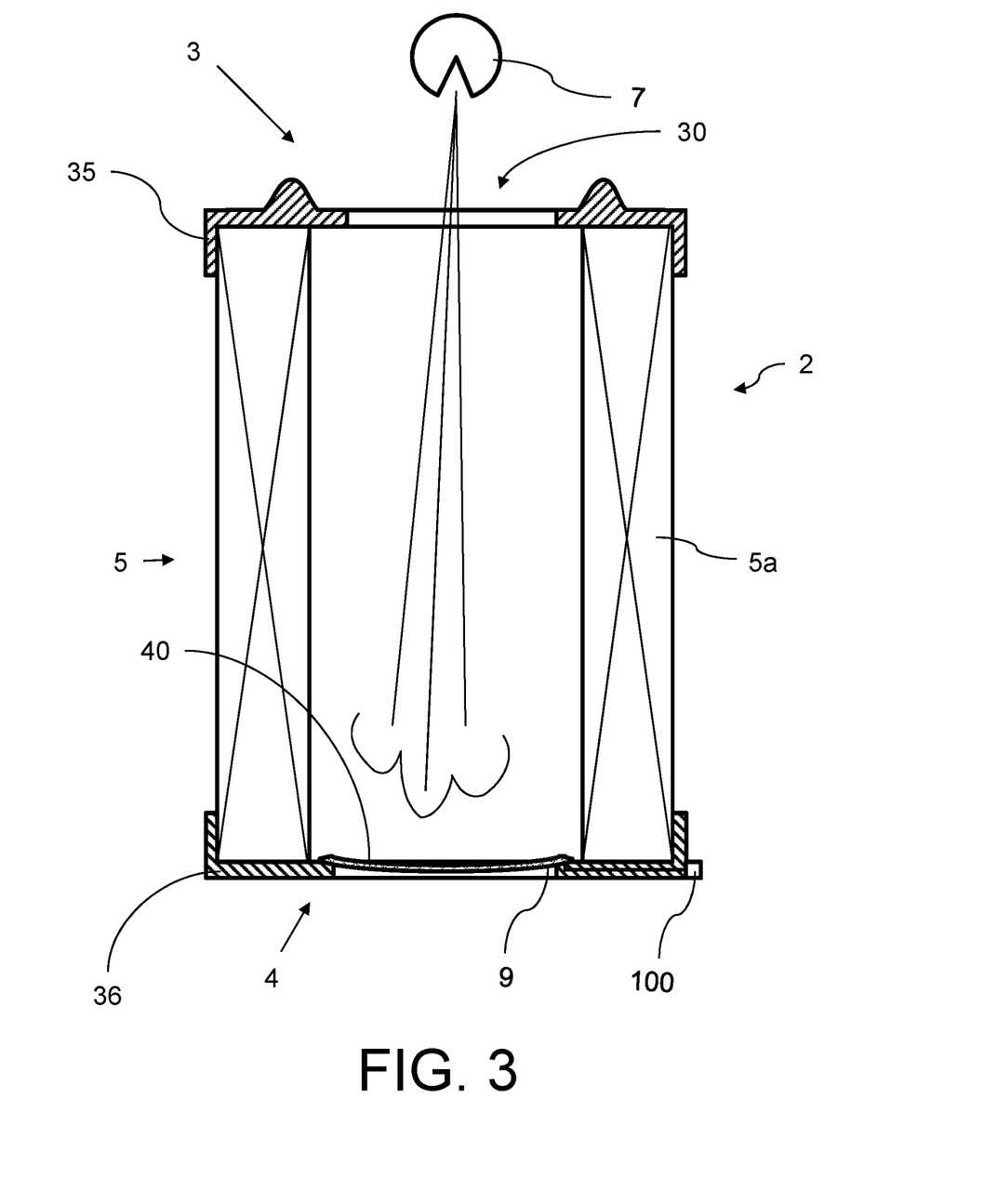
FIG. 3 shows a filter cartridge of the filter arrangement according to FIG. 1 or 2 according to a preferred embodiment example of the invention in a schematic sectional view.

FIGS. 1 and 2 each show a filter arrangement in a filter housing 1 according to a preferred embodiment example of the invention ins a schematic view. The filter arrangement has a plurality of filter cartridges 2, which are connected in parallel in the filter housing 1 to filter out particles from an airflow—the flow direction of the airflow is symbolised by arrows—and are held adjacently in a separator plate 15 in a line-up direction 50. FIG. 1 shows five filter cartridges 2 connected in parallel, whereas seven filter cartridges 2 connected in parallel are shown in FIG. 2. The filter cartridges 2 shown on the left in FIG. 2 are formed by two filter elements 20 each, whereas the filter cartridges 2 shown on the right in FIG. 2 are formed by just one filter element 20.

The filter cartridges 2, as shown in FIGS. 2 to 5 in different exemplary embodiments in schematic sectional view, are each provided in the form of a cylindrical container with an opening 30 in their upper side 3 formed by an upper end plate 35, a closed lower side 4 in the form of a lower end plate 36, and a wall 5 formed from a filter medium 5a extending between the upper side 3 and the lower side 4. Excluding the edges at the upper side 3 and at the lower side 4, the filter medium 5a runs around the entire side of the filter cartridge 2 and in this way forms the lateral surface of the cylinder. The wall 5 has folds in order to form the filter medium 5a, which folds extend between an inner wall and an outer wall of the wall 5 and are separated from one another by means of beads. A fan 6 provided on the filter housing 1 sucks the air that is to be purified through the wall 5 into an interior of the filter cartridge 2 and then out of the filter cartridge 2 through the opening 30 in the upper side 3.

In order to transport away any dirt deposited on the outer wall of the filter medium 5a, the filter arrangement has a purification device 7 in the form of a plurality of nozzles 70 and a compressed air source 75. The purification device 7 is arranged above the filter cartridges 2, wherein the nozzles 70 are designed to transport a jet of compressed air, indicated in FIG. 3, through the opening 30 into the relevant filter cartridge 2 and through the wall 5 out of the filter cartridge 2. Any dirt deposited on the outer side of the wall 5 is "blasted" radially outwardly by means of such a jet of compressed air delivered periodically by the purification device 7 and falls to the bottom in a collection container 8 of the filter arrangement. In this case, the four nozzles 70' shown in FIG. 2 are arranged statically above the filter cartridges 2 and deliver pulses of compressed air at defined time intervals, whereas the right nozzle 70" is designed as a movable nozzle which injects compressed air continuously and is moved continuously over the three right filter cartridges 2 in order to form the pulses of compressed air. The static nozzles 70' do not all deliver their pulses of compressed air simultaneously, but staggered over time.

The lower side 4 of the filter cartridge 2 in FIG. 2 is designed as a carrier plate 90 removable from the wall 5 or lower side 4 thereof. A sensor 9 is integrated on the carrier plate 90 so as to determine a force acting on a measurement region 40 formed on the lower side 4 on account of the jet of compressed air. In the embodiment shown in FIGS. 3 and 4, the sensor 9 is designed as a membrane, specifically as a stretchable elastomer film with flexible electrodes, the upper side of which facing the inner side forms the measurement region 40. By deformation of the elastomer film, indicated in FIGS. 3 and 4, the electrical capacitance of the membrane changes, such that the force acting on the measurement region 40 and thus the intensity of the jet of compressed air is determinable. The sensor signal may be transferred via a contact 100 to a control unit 13 (not shown). The sensor 9 is also supplied with power via the contact 100.

Figure 5:
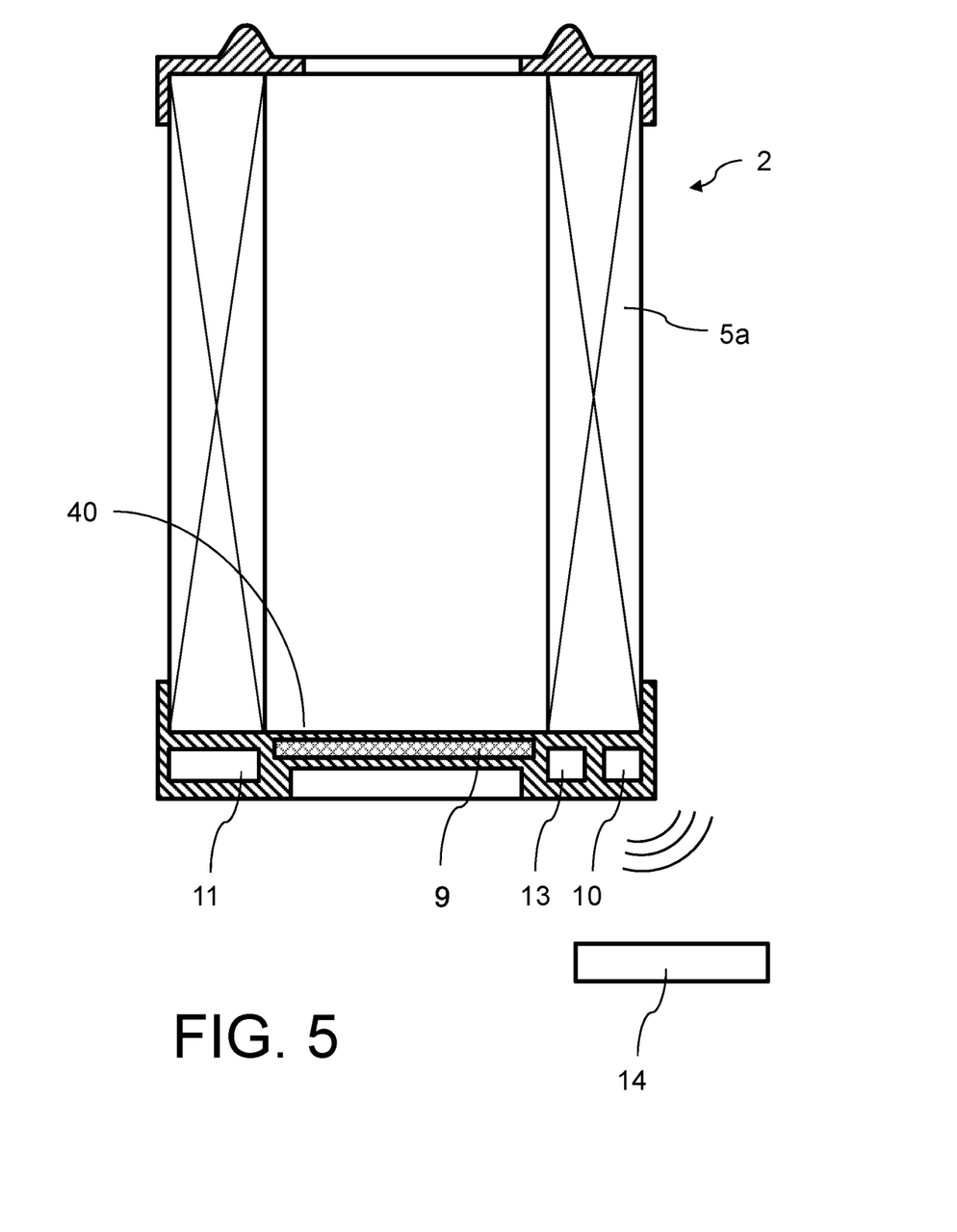
FIG. 5 shows a filter cartridge of the filter arrangement according to FIG. 1 or 2 according to a further preferred embodiment example of the invention in a schematic sectional view.

Alternatively, the lower side 4 may also be designed rigidly with a piezo element oriented towards the interior of the filter cartridge 2 as sensor 9. In addition, further sensors (not shown), such as moisture sensors and/or temperature sensors are provided for determining the moisture and/or the temperature. FIG. 5 shows a further embodiment of the sensor 9 as a strain gauge for measuring a differential pressure on the inflow and outflow side directly on the filter cartridge 2. To this end, the strain gauge is provided in a lower end plate 36 of the filter cartridge 2, where it may be moulded. The stretching of the sensor 9 is thus dependent on the stretching of the lower end plate 36 and the measurement region 40 corresponds to the surface of the lower end plate 36 lying in the filter cartridge 2. The sensor 9 may also be designed as a differential pressure sensor for determining the differential pressure between the interior of the container and the surroundings of the container.

The filter cartridge 2 also has a communications device 10 which is integrated in the lower end plate 36 and which is designed to wirelessly transmit the determined force in accordance with a WLAN, RFID and/or Bluetooth standard. A battery 11 and also a control unit 13 with an internal memory for evaluating and storing the determined force are additionally provided in the lower end plate 36, which control unit is connected to the communications device 10 and also the sensor 9. A receiving device 14 is additionally provided in the filter arrangement and receives the datasets sent from the communications device 10. The lower end plate 36 with battery 11, sensor 9, control unit 13 and communications device 10 forms a sensor unit 95. The sensor unit 95 may also be formed on a removable carrier plate 90, as shown in FIG. 2. The sensor unit in FIG. 2 comprises only the sensor 9, a battery 11 and a communications device 10, whereas the control unit 13 is formed centrally outside. A signal device 110 may display a fault to a user. If the sensor unit 95 is formed on a carrier plate 90 removable from the wall 5, as shown in FIG. 2, the battery 11 may be replaced easily or existing filter cartridges 2 may be retrofitted with a sensor unit 95 of this kind. The plurality of filter cartridges 2 of the filter arrangement are connected to a computer-based control unit 13, installed in a remote control centre, for communication with said control unit, which received and evaluates the sensor signals transmitted by the various communications devices 10 via a receiving device 14.

Figure 6:
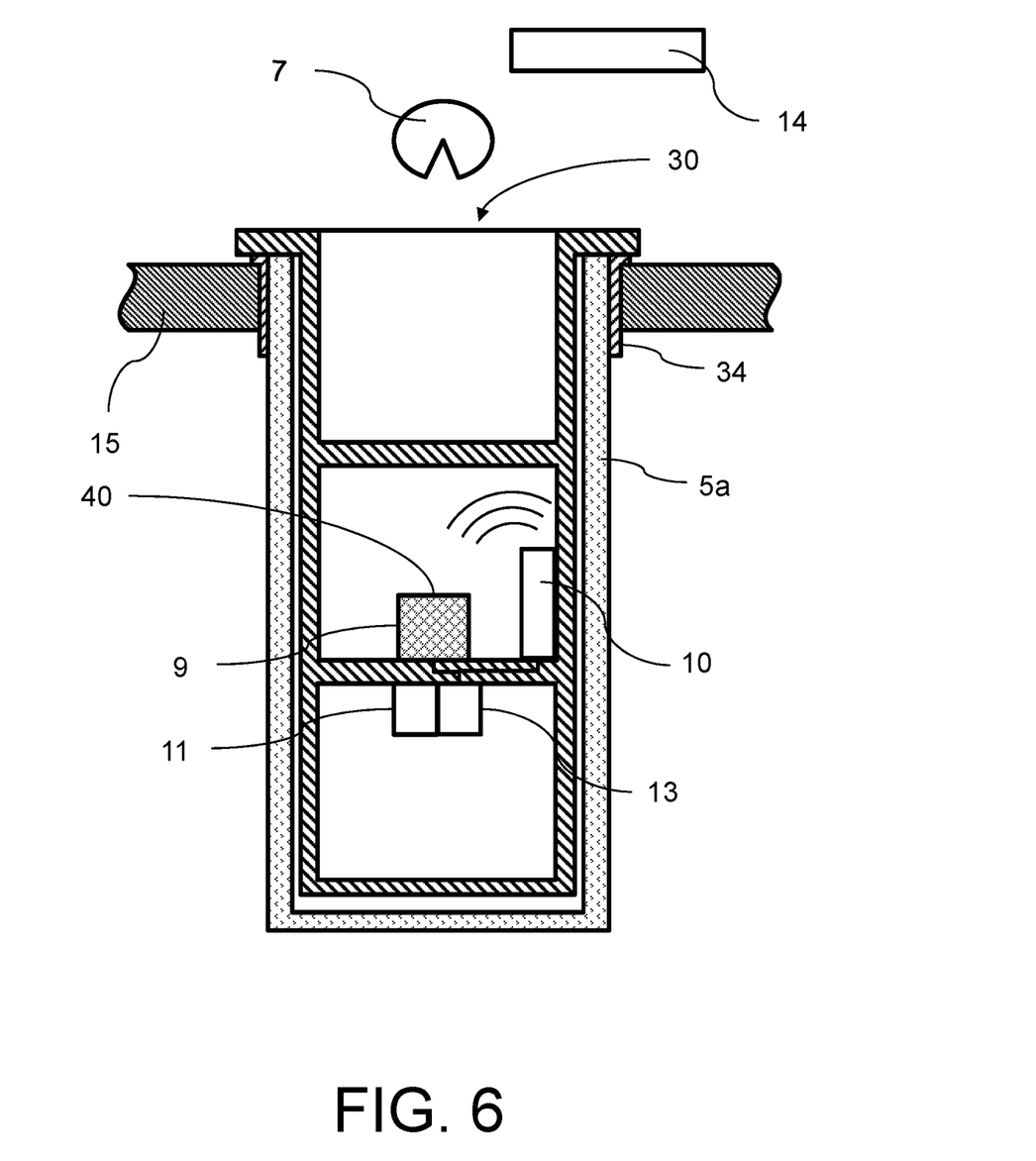
FIG. 6 shows a filter cartridge of the filter arrangement according to FIG. 1 or 2 according to an alternative embodiment example of the invention with a hose filter in a schematic sectional view.

An alternative embodiment of a filter cartridge 2 of the filter arrangement according to FIG. 1 or 2 with a hose filter is shown in FIG. 6 in a schematic sectional view. In this case, the wall 5 is formed by a filter medium 5a surrounding the filter cartridge 2 apart from on the upper side 4. The filter cartridge 2 is held in a separator plate 15 by means of a compressed sealing region 34. A support cage 19 is introduced into the filter cartridge 2, with the sensor 9 being held thereon in a position opposite the opening 30 in the filter cartridge 2. The sensor 9 is designed as a microphone, the upper side of which forms the measurement region 40, and is connected to a control device 13, which in turn is connected to a communications device 10. In addition, a battery 11 is provided on the support basket 19 to supply power to the sensor 9, the control unit 13 and the communications device 10.

Figure 7:
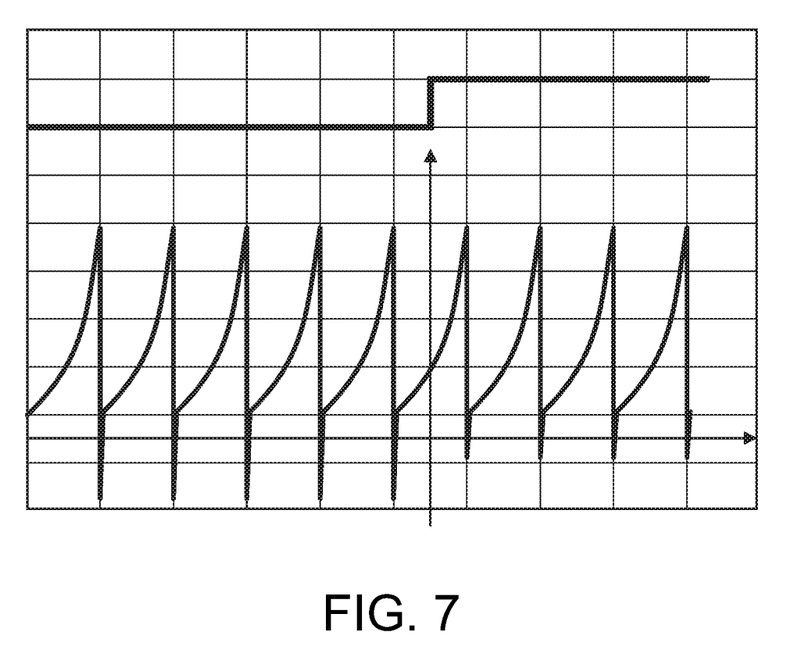
FIG. 7 shows a time graph in which a differential pressure of the filter cartridge according to FIG. 3 according to the preferred embodiment example of the invention is plotted above the volume flow and below.

FIG. 7 shows a time graph, in which the volume flow is shown at the top and the differential pressure measured by the sensor 9 is shown at the bottom, in each case over time. Accordingly, the time is plotted on the abscissa and the differential pressure on the ordinate. The differential pressure rises periodically during filter operation, in each case to a maximum. The differential pressure in cleaning operation then drops, caused by the jet of compressed air purifying the filter cartridge 2, to a negative value, which is plotted accordingly as negative amplitude of the pressure.

Figure 4:
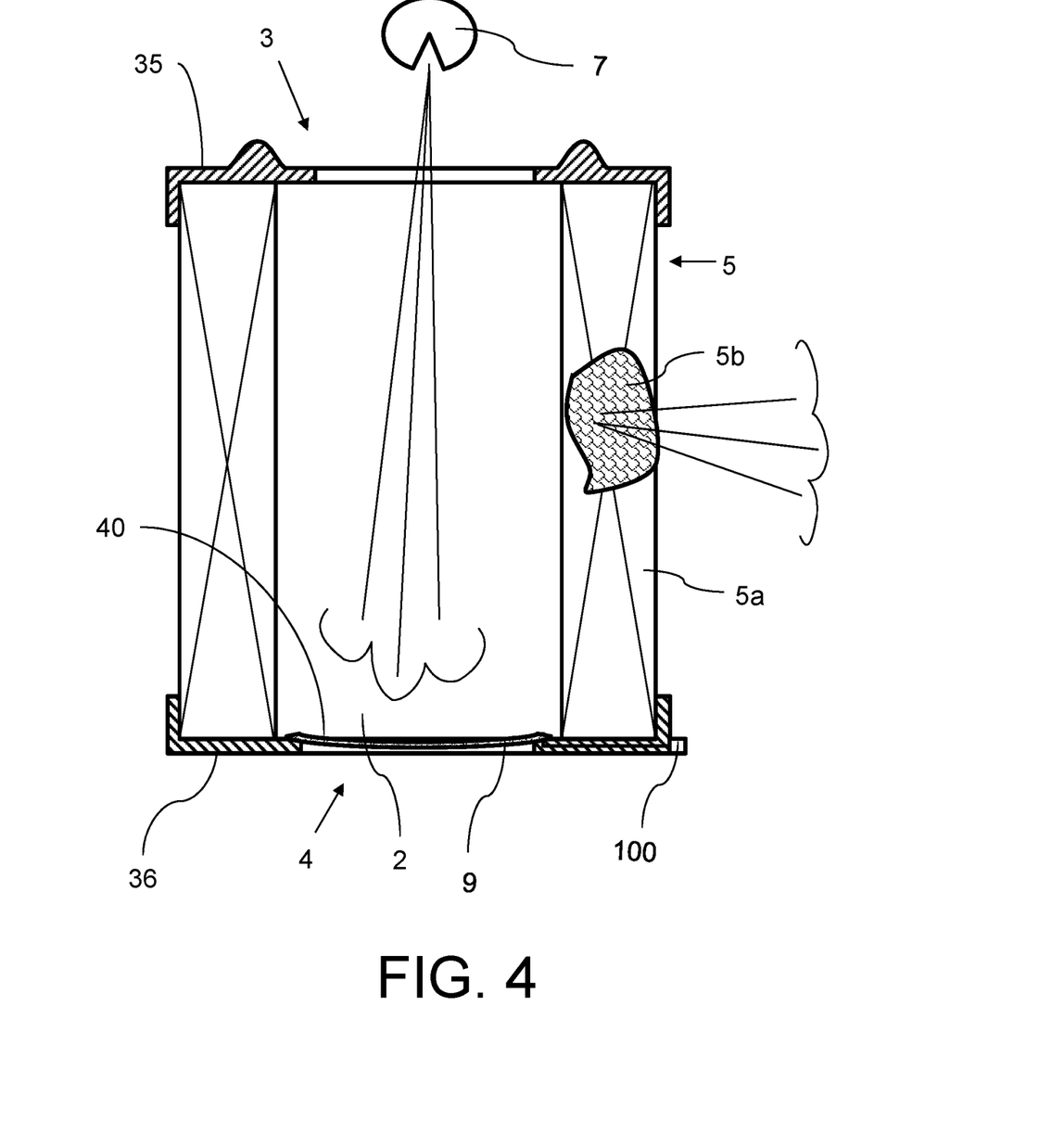
FIG. 4 shows the filter cartridge according to FIG. 3 according to the preferred embodiment example of the invention in a further schematic sectional view.

In the event of a leak 5b in the filter medium 5a, indicated in FIG. 4 in the wall 5 shown in the right and in FIG. 7 where the axes cross over time, the volume flow through the filter cartridge 2 increases on the one hand. On the other hand, the negative amplitude of the pressure reduces. The reduction of the negative amplitude corresponds to the change in the force acting on the sensor 9 as a result of the jet of compressed air. The control unit 13 is designed to detect such a change or the reduced negative amplitude, so that a leak 5b of the relevant filter medium 5a may thus be determined and the need to replace the filter cartridge 2 is identifiable.

The described embodiment examples are merely examples and may be modified and/or supplemented in a wide range of ways within the scope of the claims. Any feature that has been described for a specific embodiment example may be used independently or in combination with other features in an arbitrary other embodiment example. Any feature that has been described for an embodiment example of a specific category may also be used accordingly in an embodiment example of another category.

LIST OF REFERENCE SIGNS

Filter housing 1
Filter cartridge 2
Upper side 3
Lower side 4
Wall 5
Filter medium 5a
Leak 5b
Fan 6
Purification device 7
Collection container 8
Sensor 9
Communications device 10
Battery 11
Control unit 13
Receiving device 14
Separator plate 15
Support basket 19
Filter element 20
Opening 30
Sealing region 34
Upper end plate 35
Lower end plate 36
Measurement region 40
Line-up direction 50
Nozzle 70/static nozzle 70'/moving nozzle 70"
Compressed air source 75
Carrier plate 90
Sensor unit 95
Contact 100
Signal device 110

The invention claimed is:

1. A filter arrangement comprising
a filter cartridge, having an opening and a wall which is formed by a filter medium and has an inner side delimiting a clean side of the filter and an outer side delimiting a raw side of the filter,
a fan for conveying air to be purified first through the wall and subsequently through the opening of the filter cartridge,
a purification device, which is configured to convey a jet of compressed air through the opening into the filter cartridge and through the wall out of the filter cartridge, for conveying dirt away from an outer wall of the wall, and
a sensor configured to determine a force acting on a measurement region on the basis of the jet of compressed air,
wherein the sensor is designed as a membrane, and
wherein the measurement region is arranged at a lower side of the filter cartridge which is located opposite the opening.

2. The filter arrangement according to claim 1, wherein the sensor is designed for measuring a differential pressure on an inflow and outflow side, as a differential pressure sensor for determining the differential pressure between an interior of the filter cartridge and the surroundings of the filter cartridge, as a microphone and/or as an optical sensor.

3. The filter arrangement according to claim 1, wherein the filter cartridge is formed of at least two filter elements, each with a wall formed of the filter medium, with an inner side delimiting the clean side of the filter and an outer side delimiting the raw side of the filter, wherein the outer sides of the filter elements form the outer side of the filter cartridge, the measurement region is one of arranged in a filter element of the filter cartridge or in the filter element distanced furthest from the opening of the filter cartridge, and the filter element has a the sensor.

4. The filter arrangement according to claim 1, wherein the measurement region is arranged on a carrier plate that is removable from the filter cartridge and has the sensor.

5. The filter arrangement according to claim 1, with a computer-based control unit which is configured to receive and to analyse signals transmitted by the sensor, to determine, on the basis of a change of the sensor signal, a change to the force acting on the measurement region as a result of a jet of compressed air so as to detect a leak in the filter cartridge, and/or to determine, on the basis of the change to the sensor signal, that the filter cartridge needs replacing.

6. The filter arrangement according to claim 5, wherein the sensor is designed as part of a sensor unit which additionally comprises the computer-based control unit.

7. The filter arrangement according to claim 6, wherein the sensor unit comprises at least one further sensor for detecting an ambient value or for detecting temperature and/or air humidity.

8. The filter arrangement according to claim 6, with a plurality of filter cartridges and a plurality of sensor units, wherein each sensor unit has a communications device designed at least for one of wireless transmission, in accordance with a WLAN, RFID, ZigBee, Z-wave and/or Bluetooth standard, of a dataset generated by the control unit.

9. The filter arrangement according to claim 8, wherein each communications device is positioned on a filter cartridge in such a way that a main transmission power is oriented orthogonally to a direction of arrangement of the filter cartridges.

10. The filter arrangement according to claim 8, wherein each sensor unit has a battery and is configured such that the corresponding communications device transmits the dataset only if a leak of the corresponding filter cartridge is determined and/or if it is determined that the corresponding filter cartridge has to be replaced or after a fixed time interval and/or once an output request has been received.

11. The filter arrangement according to claim 8, wherein a receiving device for receiving datasets of the communications devices is provided and is configured to determine the transmission position of a communications device on the basis of a corresponding signal strength and/or signal coding.

12. The filter arrangement according to claim 5, with a plurality of filter cartridges and a plurality of sensors each with an associated measurement region, wherein the computer-based control unit is configured to receive and to evaluate all signals transmitted by the plurality of sensors, to determine, on the basis of a change of a sensor signal, a change to the force acting on the corresponding measurement region as a result of a jet of compressed air so as to detect a leak in the corresponding filter cartridge, and/or to determine, on the basis of the change to the corresponding sensor signal, that the filter cartridge needs replacing.

13. A method for detecting a leak of a filter cartridge, wherein the filter cartridge has an opening and a wall which is formed of a filter medium and which has an inner side delimiting a clean side of the filter and an outer side delimiting a raw side of the filter, said method having the steps of:
- supplying a jet of compressed air through the opening into the filter cartridge;
- transmitting a sensor signal, which is generated by a sensor designed as a membrane and on account of the jet of compressed air, to a control unit; and
- determining a force acting on a measurement region, which is arranged at a lower side of the filter cartridge and located opposite the opening, as a result of the jet of compressed air.

14. The method according to claim 13, with the steps of:
- determining, by the control unit, a change to the force acting on the measurement region as a result of the jet of compressed air so as to detect a leak of the filter medium; and/or
- determining, by the control unit, on the basis of the change to the force acting on the measurement region, that the filter cartridge needs replacing.

15. The method according to claim 14, with the steps of:
- generating a dataset with information regarding a state of the filter cartridge by the control unit and transmitting the dataset by a communications device to a receiving device if:
  - an output request was received beforehand by the communications device, and/or
  - a leak of the filter medium was detected by the control unit, and/or
  - it has been determined by the control unit that the filter cartridge needs replacing.

16. The method according to claim 13, wherein the sensor is designed as a piezo element, as a membrane, as an elastomer film, as a strain gauge, for measuring a differential pressure on the inflow and outflow side, as a differential pressure sensor for determining the differential pressure between an interior of the filter cartridge and the surroundings of the filter cartridge, as a microphone and/or as an optical sensor.

17. The method according to claim 13, having a plurality of filter cartridges and a plurality of sensors.

* * * * *